United States Patent [19]
Waido

[11] Patent Number: 5,327,181
[45] Date of Patent: Jul. 5, 1994

[54] PROGRESSIVE LENS FOR SPECIALTY AND OCCUPATIONAL USE

[75] Inventor: Richard P. Waido, West Woodstock, Conn.

[73] Assignee: Gentex Optics, Inc., Carbondale, Pa.

[21] Appl. No.: 3,391

[22] Filed: Jan. 12, 1993

[51] Int. Cl.⁵ ............................................. G02C 7/06
[52] U.S. Cl. ................................................. 351/169
[58] Field of Search ............................. 351/169, 168

[56] References Cited

U.S. PATENT DOCUMENTS

| | | | |
|---|---|---|---|
| 4,514,061 | 4/1985 | Winthrop | 351/169 |
| 4,854,689 | 8/1989 | Dufour et al. | 351/169 |
| 4,861,153 | 8/1989 | Winthrop | 351/169 |
| 5,048,945 | 9/1991 | Ueno et al. | 351/169 |
| 5,123,725 | 6/1992 | Winthrop | 351/169 |
| 5,210,553 | 5/1993 | Barth et al. | 351/169 |

FOREIGN PATENT DOCUMENTS

91/01508  2/1991  World Int. Prop. O. .......... 351/169

Primary Examiner—Richard A. Bertsch
Assistant Examiner—Howard R. Richman
Attorney, Agent, or Firm—Shenier & O'Connor

[57] ABSTRACT

A progressive addition lens constructed on the bipolar principle in accordance with a power law having a steeper slope or gradient in the regions adjacent to the poles than in the middle region thereof between the poles.

11 Claims, 5 Drawing Sheets

PROGRESSIVE LENS FOR SPECIALTY AND OCCUPATIONAL USE

FIELD OF THE INVENTION

The invention is in the field of progressive lenses and, more particularly, it relates to a progressive lens which is adapted for specialty and occupational use rather than for general use.

BACKGROUND OF THE INVENTION

There are known in the art progressive lenses which provide a smooth transition of optical power between a near viewing region and a far viewing region.

Winthrop U.S. Pat. Nos. 4,861,153 and 5,123,725 disclose progressive lenses which are constructed in accordance with the bipolar principle. As is explained in these patents, in such a lens both the near vision zone and the distance vision zone are reduced to mathematical points or poles.

Further as is known in the art, lenses are constructed in accordance with a power law, which determines a portion of the lens meridian, which in turn may, as here, lie entirely in the Y-Z plane of a Cartesian coordinate system. Generally, lenses manufactured in accordance with the disclosures of the Winthrop patents have power laws the curves of which have relatively low slopes or gradients adjacent to the poles and a higher slope or gradient intermediate the poles. In accordance therewith, the '153 patent discloses a first numerical example of an ordinary progressive lens which is constructed in such a way as to provide relatively large areas of optical stability at the poles while minimizing astigmatism. This patent discloses a second numerical example which utilizes a linear power law to provide what is said to be possibly the lowest level of astigmatism possible in a progressive lens with umbilic vertical meridian.

The '725 patent adds third and fourth numerical examples, both of which are constructed in accordance with a power law of the same type as that of the first example of the '153 patent. The third example relates to what is identified as an occupational lens which has improved near utility at the expense of distance utility. While the fourth example, which is said to be a dynamic activity lens, has improved distance utility at the expense of near utility.

SUMMARY OF THE INVENTION

One object of my invention is to provide a progressive lens which is adapted for specialty uses.

Another object of my invention is to provide a progressive lens adapted for specialty uses which has extremely low minimum astigmatism, as compared with lenses of the prior art.

Another object of my invention is to provide a progressive lens for specialty uses which has a low average astimatism, as compared with lenses of the prior art.

A still further object of my invention is to provide a progressive lens for specialty uses which has a limited range of optical powers while possessing small areas of higher and lower optical powers.

Yet another object of my invention is to provide a progressive lens for specialty uses which is constructed in accordance with a power law, the slope of which is greater in the region of the poles than in the intermediate region.

Other and further objects of my invention will appear from the following description.

BRIEF DESCRIPTION OF THE DRAWINGS

In the accompanying drawings to which reference is made in the instant specification and which are to be read in conjunction therewith and in which like reference characters are used to indicate like parts in the various views.

DESCRIPTION OF THE PREFERRED EMBODIMENT

The Winthrop patents referred to hereinabove disclose a lens formed on the bipolar principle in accordance with a power law which has a relatively low slope adjacent to the poles and a relatively steeper slope in the central portion thereof. The lens is said to have a relatively low maximum astigmatism and a relatively low average astigmatism over the surface of the lens. A power curve of the character employed in the general case in the Winthrop patents is illustrated in dot-dash lines in FIG. 1.

In the second numerical example given in the Winthrop patents, the lens is constructed in accordance with a linear power law which is said to result in a lens which possesses what may be the lowest level of astigmatism possible in a progressive lens with umbilic vertical meridian. A power law of this nature is indicated in the dash line of FIG. 1.

In the Winthrop patents the lenses have a reading addition of 2.00 diopters on a 6.00 diopter base curve and an index of refraction of 1.498. In the discussion hereinbelow, I have selected the same parameters for lenses constructed in accordance with my invention and, to facilitate comparison, have selected the same pole locations.

I have discovered that a lens constructed in accordance with a power law having a relatively steep slope or gradient in the regions of the poles and a lower gradient in the intermediate portion thereof, has an average astigmatism which is considerably lower than that of the linear power law lens of Winthrop and which has a remarkably low minimum astigmatism.

One form of my power law which, for essentially the same design parameters as in the second example of Winthrop, provides considerable improvement, is given by the relationship:

$$P = 7 - Y/19 + 0.104 e^{1.44(Y/19)^2} \sin(\pi Y/19) \quad (1)$$

where P is optical power in diopters, Y is a coordinate whose axis is the vertical principal meridian of the lens and $\pi = 3.14159+$.

Figure 1:
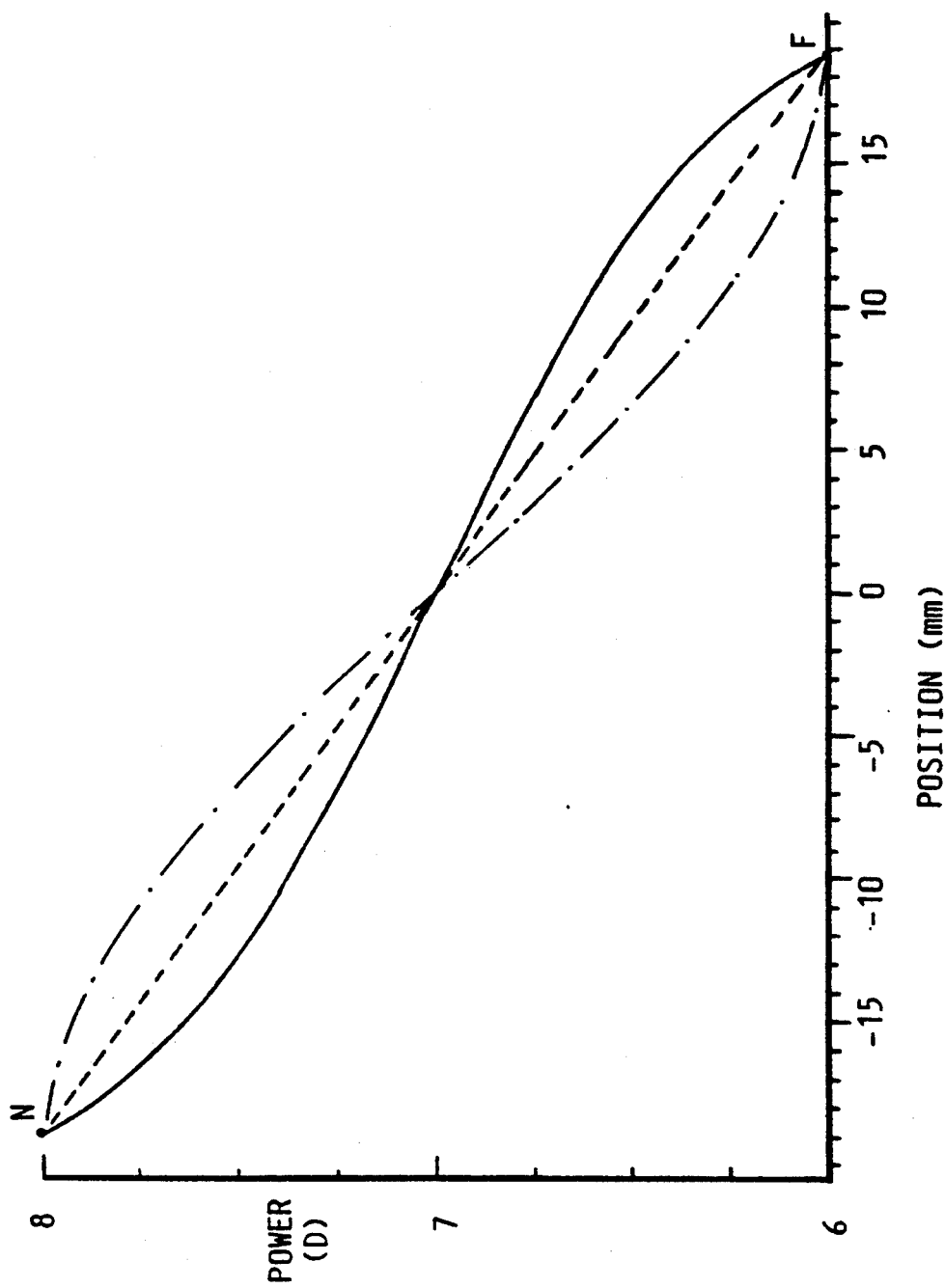
FIG. 1 is a graph illustrating the relationship between power laws of the prior art and one form of non-linear power law which I use in constructing my improved progressive addition lens designed on the bipolar principle for specialty and occupational use.

Referring now to FIG. 1, I have shown various power law plots for a lens the poles of which are located at $+19$ millimeters and $-19$ millimeters along the vertical principle meridian of the lens, which is the horizontal axis in the figure. The dot-dash line indicates a power curve according to the Winthrop patents in which the slope or gradient at the poles is less than the slope or gradient in the center of the lens. The broken line in FIG. 1 illustrates the limit condition of Example 2 of the Winthrop patents wherein a linear power curve is employed. The full line curve of FIG. 1 is in accordance with Equation (1) hereinabove. As will be apparent from the Figure, for my power curve illustrated in the full line in FIG. 1, the slope or gradient is greater in the region of the poles than it is at the center of the lens.

Figure 2:
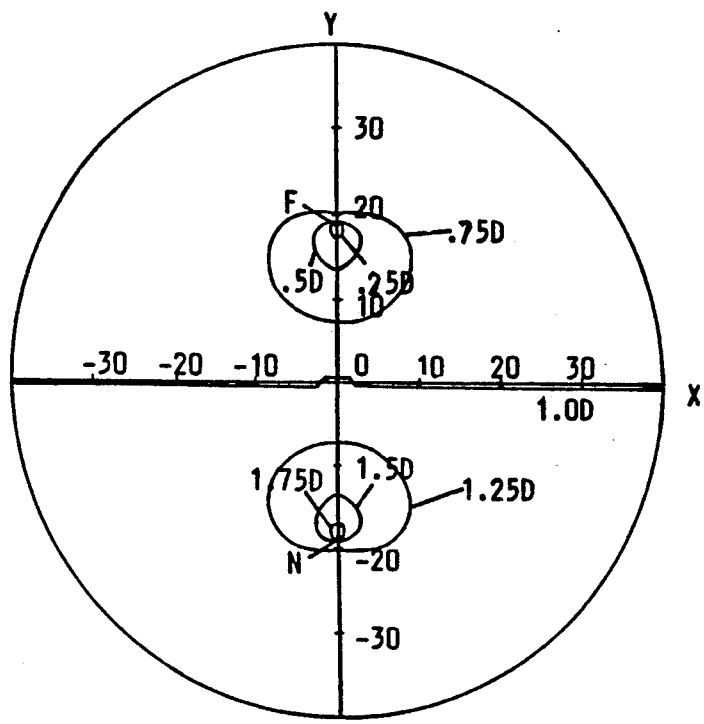
FIG. 2 is a graph showing the mean add in 0.25 diopter contour intervals of the surface of a progressive addition lens designed on the bipolar principle and constructed in accordance with the form of my non-linear power law shown in FIG. 1.

Referring now to FIG. 2, there is shown the mean add in 0.25 diopter contour intervals of a lens constructed in accordance with the bipolar principle with a power curve shown in full lines in FIG. 1. As is known in the art, "mean add" is the amount by which the spherical-equivalent optical power exceeds the distance optical power. As can be seen by reference to FIG. 2, the mean add varies from zero to 0.25 D within the innermost contour of the upper semicircle of FIG. 2, which encompasses the far vision pole of the bipolar system; between 0.25 D and 0.5 D between the innermost contour and the next contour of the upper semicircle of FIG. 2; and between 0.5 and 0.75 D over the area between the next to innermost contour and the outermost contour of the upper semicircle of FIG. 2. The mean add continues to vary over the remainder of the upper semicircle and into the lower semicircle as indicated by the diopter numbers applied to the curves until it reaches a maxium within the innermost contour of the lower semicircle of FIG. 2, which contour is labeled 1.75 D and which encompasses the near vision pole N of the bipolar system.

Figure 3:
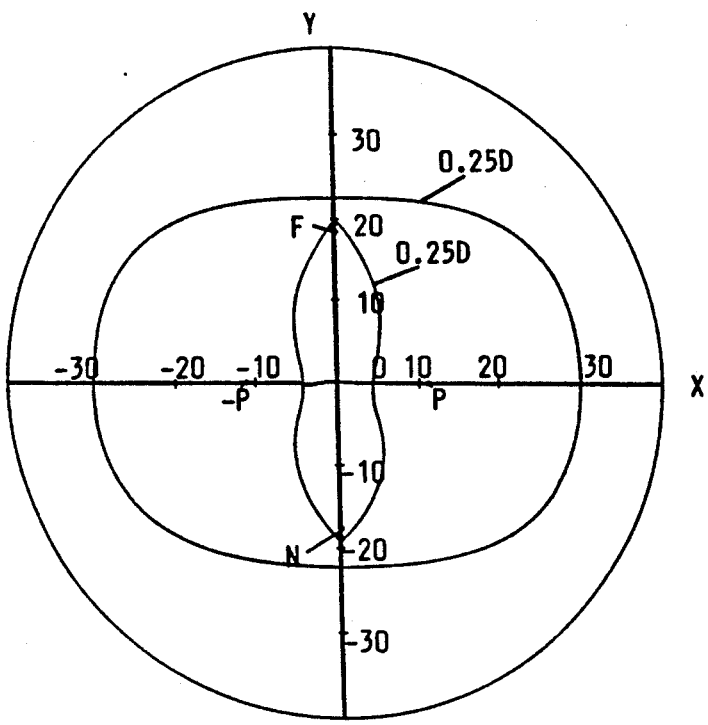
FIG. 3 is a graph showing the astigmatism in 0.25 diopter contour intervals of the surface of a progressive addition lens designed on the bipolar principle and constructed in accordance with the form of my non-linear power law illustrated in FIG. 1.
Figure 4:
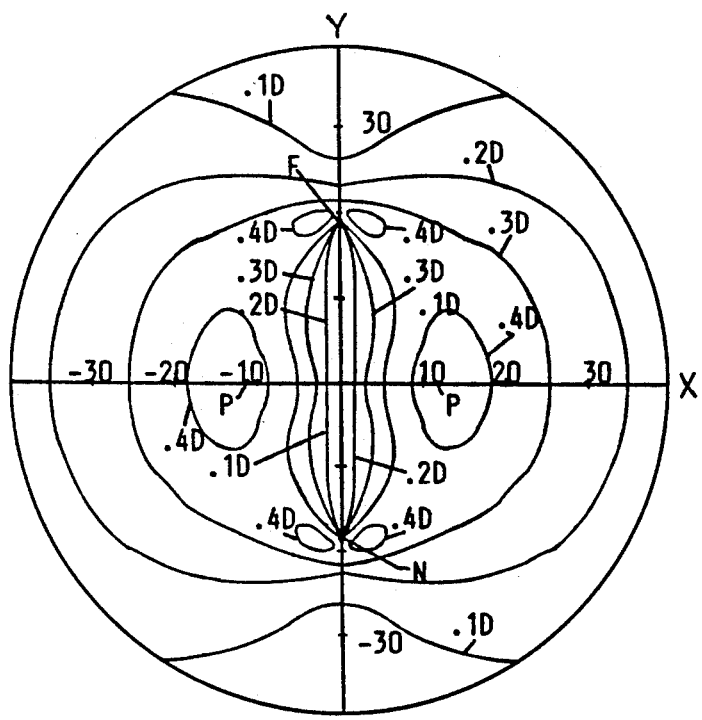
FIG. 4 is a graph showing the astigmatism in 0.10 diopter contour intervals of the surface of a progressive addition designed on the bipolar principle and constructed in accordance with the form of my non-linear power law illustrated in FIG. 1.

FIGS. 3 and 4 respectively show the surface astigmatism of the surface of FIG. 2 in 0.25 D and 0.10 D contour intervals. In FIG. 3, for example, the astigmatism varies from zero within the inner contour line to 0.25 D at the inner contour line; from 0.25 D at the inner contour line to a maximum within the inner and outer contour lines and back to 0.25 D at the outer contour line and from there back to lower values. The computed maximum astigmatism between the two contours is about 0.44 D. This maximum occurs at the points $-P$ and P which are at or near $X = +$ or $-11$ and $Y = 0$.

FIG. 4 is a finer representation of the astigmatism of a surface constructed in accordance with FIG. 2. In the representation of FIG. 4, the astigmatism varies from zero to 0.1 D outside the uppermost and lowermost contours of the figure. Between this and the next contour, the astigmatism varies between 0.1 D and 0.2 D and so on, as indicated in the figure. Again, as shown in FIG. 3, the maximum astigmatism occurs at or near $X = +$ and $-11$ and $Y = 0$. These two points are indicated by P in FIG. 4. It is noted that the plot of FIG. 4 also reveals pockets of higher astigmatism adjacent to the poles F and N.

According to the Winthrop patents, for his limiting case of a linear power law the maximum surface astigmatism is said to be 0.66 D or ⅓ the add power of 2.00 D. Winthrop points out that this may well represent the minimum value possible in a progressive lens with umbilic vertical meridian.

As will be apparent from the above, a lens constructed in accordance with the form of my power law illustrated in a full line in FIG. 1, has a surprisingly low maximum astigmatism value of about 0.44 D, or 0.22 D less than the minimum value suggested in Winthrop.

In addition to having a low maximum astigmatism value, a lens constructed in accordance with the full line power law of FIG. 1 has an average astigmatism of approximately 0.21 D which is only ⅔ of the average astigmatism value given in the limiting case in Example 2 of the Winthrop patents. These patents indicate an average astigmatism value of 0.32 D for an 80 mm blank such as shown in FIGS. 3 and 4.

Another form of power law in accordance with my invention is given by the relationship:

$$P = 7 - (1 - K) - K(Y/19)^N \quad (2)$$

where K is a constant and the exponent N is an odd positive integer. For each exponent N, there is a value of K which minimizes the peak surface astigmatism "A". The table hereinbelow gives some cases.

TABLE

| N | 7 | 9 | 11 | 13 | 15 |
|---|---|---|---|---|---|
| K | .3189 | .3409 | .3550 | .3644 | .3723 |
| A | .443D | .429D | .420D | .414D | .409D |

Figure 5:
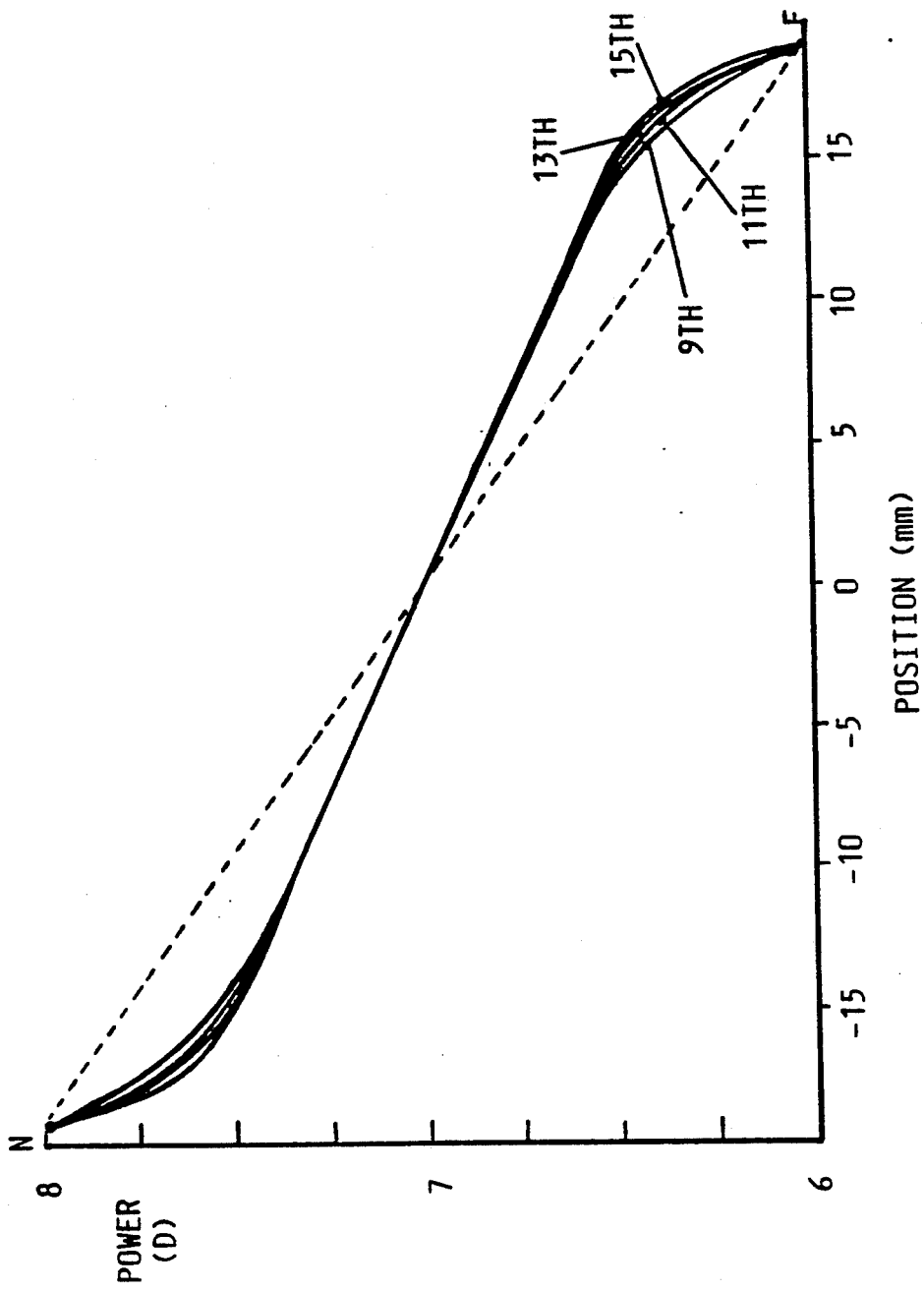
FIG. 5 is a graph illustrating the relationship between a linear power law and another form of my non-linear power law which I use in constructing my improved progressive addition lens designed on the bipolar principle for specialty and occupational use.

Referring to FIG. 5, I have shown a plot of various specific instances of the form of my power law set forth in Equation (2). FIG. 5 shows in full lines the curves of the form of my power law set forth in Equation (2) for the values of $N = 9, 11, 13$ and 15. For purposes of comparison, I have also shown the linear power law of the second numerical example of the Winthrop patents. As can readily be seen by reference to FIG. 5, each of the specific forms of my power law illustrated in FIG. 5 conforms to the rule that the slope or gradient is greater in the region of the poles than it is in the middle of the lens.

In connection with the second form of my power law set forth in Equation (2), it is to be noted that one must be careful about using larger exponents N in an effort to achieve even lower values of peak surface astigmatism.

This is owing to the fact that small pockets of astigmatism form very close to the poles and higher values of astigmatism can be hidden if the sampling is too coarse. It is for this reason that all of five cases of the above table were verified on a 0.1 mm net.

It is to be noted further that the constant K need not take on the extreme values illustrated above. Lesser values allow greater peak surface astigmatism.

Figure 6:
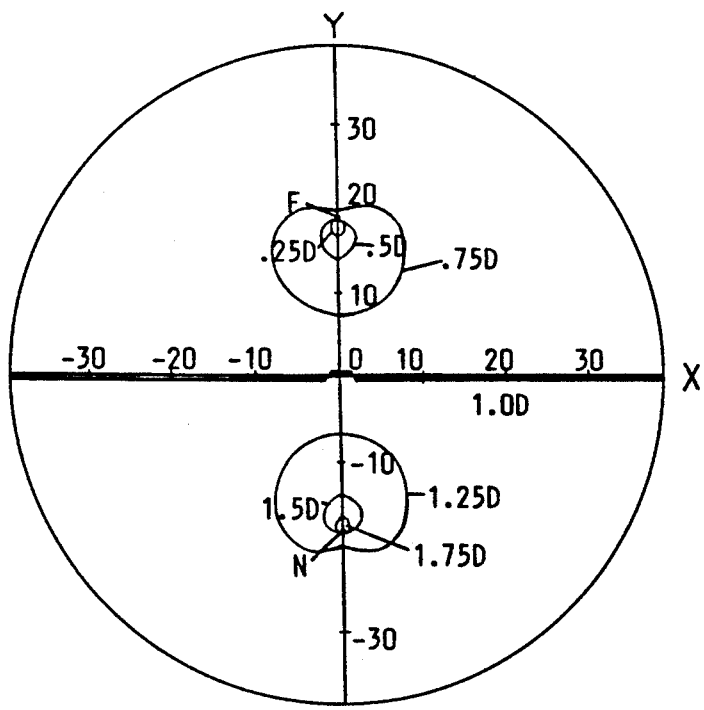
FIG. 6 is a graph showing the mean add in 0.25 diopter contour intervals of a progressive addition lens designed on the bipolar principle and constructed in accordance with a specific case of the form of my non-linear power law shown in FIG. 5.

FIG. 6 shows the mean add of the surface resulting from the specific case of N=15 in Equation (2) in 0.25 D contour intervals. In this figure the mean add varies from zero at the F pole to 0.25 D at the innermost contour line, from 0.25 D to 0.5 D over the area between the innermost and next contour of the upper semicircle in FIG. 6 and so forth over the surface of the lens in accordance with the diopter labels which have been applied to the various contour lines until it reaches 2.00 D at the N pole.

Figure 7:
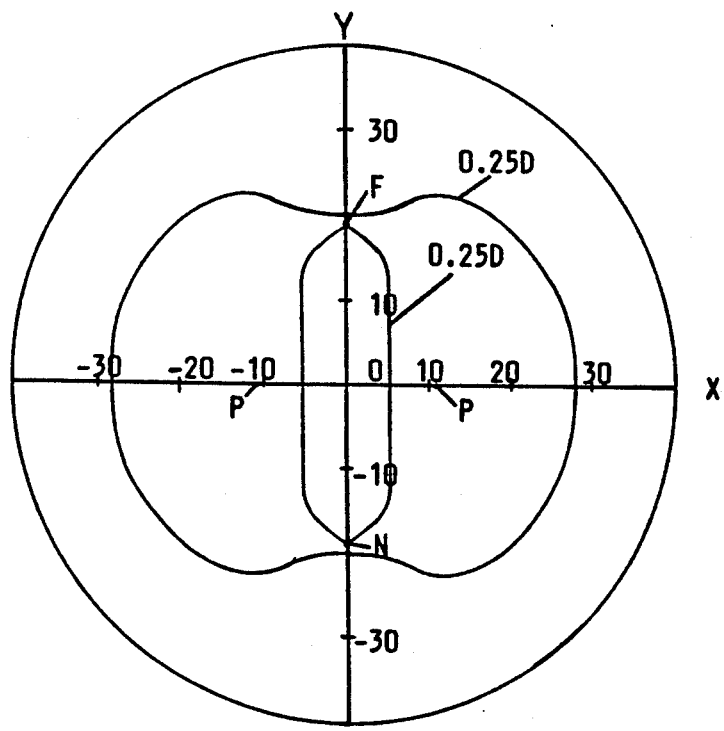
FIG. 7 is a graph showing the astigmatism in 0.25 diopter contour intervals of the surface of a progressive addition lens designed on the bipolar principle and constructed in accordance with the specific case of my non-linear power law of FIG. 5 used in FIG. 6.
Figure 8:
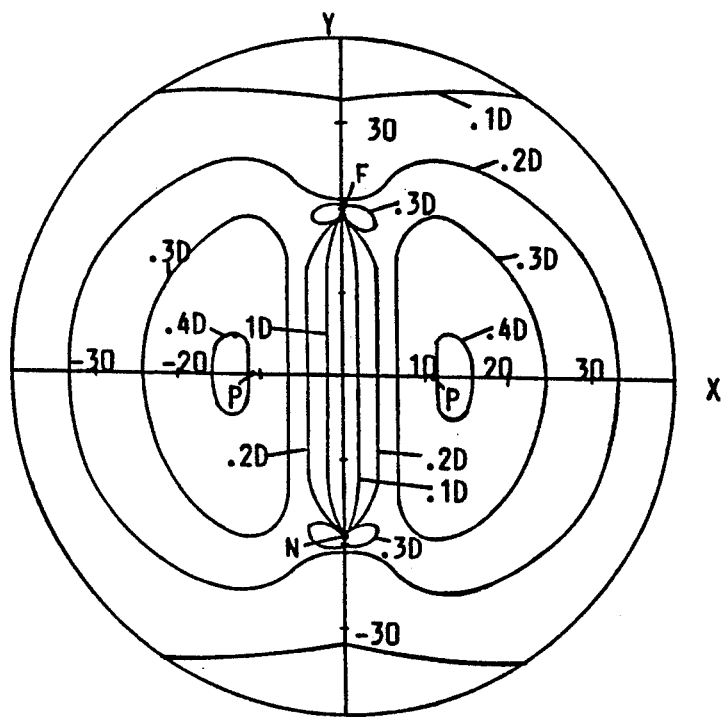
FIG. 8 is a graph showing the astigmatism in 0.10 diopter contour intervals of the surface of a progressive addition lens designed on the bipolar principle and constructed in accordance with the specific case of my non-linear power law of FIG. 5 used in FIG. 6.

FIGS. 7 and 8 respectively show the astigmatism in 0.25 D and 0.10 D contour intervals of a surface in accordance with FIG. 6. As was the case with FIGS. 3 and 4 hereinabove, the maximum value of astigmatism in FIGS. 7 and 8 occurs at or near X=+ and −11 and Y=0. This is indicated by the points labeled P in FIGS. 7 and 8. The maximum value is computed to be about 0.41 D. As to FIG. 7, the astigmatism varies from zero within the inner contour line to 0.25 D at the inner contour line to the maximum value at P within the inner and outer contour lines, decreases again to 0.25 D at the outer contour line and then falls to lower values outside the outer contour line.

As to FIG. 8, the astigmatism is shown more finely as varying in accordance with the various diopter markings applied to the contour lines. FIG. 8 also reveals the small pockets of higher astigmatism values adjacent to the poles F and N.

The maximum astigmatism value of about 0.41 D for this case is a full 0.25 D less than the value of 0.66 D given in the Winthrop patent for the limiting case of a linear power law discussed therein. In addition, the average astigmatism of about 0.20 D is remarkably low as compared with the average astigmatism given in connection with the limiting example of Winthrop.

From FIGS. 2 and 6 it can be seen that the areas of optical stability adjacent to the poles are relatively small. Accordingly, a lens constructed in accordance with my invention is particularly suited for specialty uses requiring only a limited range of optical powers and relatively small areas of higher and lower optical powers.

Save for the use of the forms of my power law disclosed hereinabove, lenses according to my invention are constructed in accordance with the known bipolar principle such as is set forth in the Winthrop patents referred to hereinabove and the disclosures of which are incorporated by reference herein.

It will be seen that I have accomplished the objects of my invention. I have provided a progressive addition lens designed for specialty uses requiring only a limited range of optical powers with small areas of higher and lower optical powers. My lens has both an extremely low maximum astigmatism and an extremely low average astigmatism as compared with progressive lenses of the prior art. My lens is constructed in accordance with a power law, the slope of which is greater in the regions adjacent to the poles than in the middle region thereof.

It will be understood that certain features and subcombinations are of utility and may be employed without reference to other features and subcombinations. This is contemplated by and is within the scope of my claims. It is further obvious that various changes may be made in details within the scope of my claims without departing from the spirit of my invention. It is, therefore, to be understood that my invention is not to be limited to the specific details shown and described.

Having thus described my invention, what I claim is:

1. A lens having near vision and far vision poles and a progressive surface between said poles, said progressive surface having regions adjacent to said poles and a middle region between said poles and having a power law which provides power gradients in said regions adjacent to the poles which are relatively steep as contrasted with relatively gradual power gradients in said middle region thereof between said poles.

2. A lens as in claim 1 having a vertical principle meridian and in which the power law has the formula $$P = 7 - Y/19 + 0.104 e^{1.44(Y/19)^2} \sin(\pi Y/19)$$

where P is optical power in diopters and Y is a Cartesian coordinate whose axis is the vertical principal meridian of the lens.

3. A lens as in claim 1 having a maximum surface astigmatism of about 0.44 D.

4. A lens as in claim 1 having an average surface astigmatism of about 0.21 D.

5. A lens as in claim 1 having a peak surface astigmatism and in which the power law has the formula $$P = 7 - (1-K)(Y/19) - K(Y/19)^N$$

where P is optical power in diopters, Y is a Cartesian coordinate whose axis is the vertical principal meridian of the lens, N is an odd positive integer and K is a constant which minimizes the peak surface astigmatism of the lens.

6. A lens as in claim 5 in which N is 7 and K is 0.3189 to give a peak surface astigmatism for the lens of 0.443 diopter.

7. A lens as in claim 5 in which N is 9 and K is 0.3409 to give a peak surface astigmatism for the lens of 0.429 diopter.

8. A lens as in claim 5 in which N is 11 and K is 0.3550 to give a peak surface astigmatism for the lens of 0.420 diopter.

9. A lens as in claim 5 in which N is 13 and K is 0.3644 to give a peak surface astigmatism for the lens of 0.414 diopter.

10. A lens as in claim 5 in which N is 15 and K is 0.3723 to give a peak surface astigmatism for the lens of 0.409 diopter.

11. A lens having near vision and far vision poles and a progressive surface between said poles, said progressive surface having regions adjacent to said poles and a middle region between said poles and having a power law which provides a power gradient in the region adjacent to one of the poles than in said middle region of said progressive surface.

* * * * *

UNITED STATES PATENT AND TRADEMARK OFFICE
CERTIFICATE OF CORRECTION

PATENT NO. : 5,327,181
DATED : July 5, 1994
INVENTOR(S) : Richard P. Waido

It is certified that error appears in the above-identified patent and that said Letters Patent is hereby corrected as shown below:

Column 6, claim 5, line 1 - after "having a" insert

-- vertical principle meridian and a --.

Column 6, claim 11, line 6 - after "poles" insert

-- which is relatively steeper --.

Signed and Sealed this

Twentieth Day of September, 1994

Attest:

BRUCE LEHMAN

Attesting Officer

Commissioner of Patents and Trademarks